Nov. 3, 1964  W. LEHMER ETAL  3,155,469
PROCESS FOR REMOVING TRACE ADMIXTURES FROM REACTOR COOLANT GAS
Filed Jan. 5, 1962
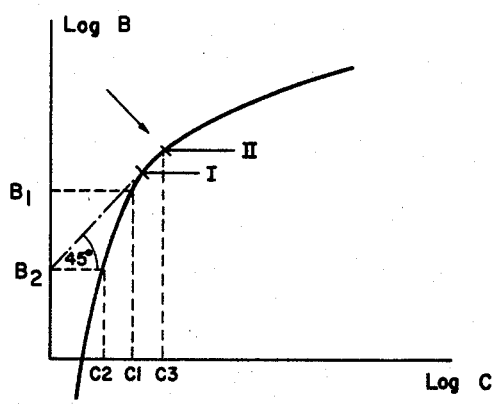
FIG. I
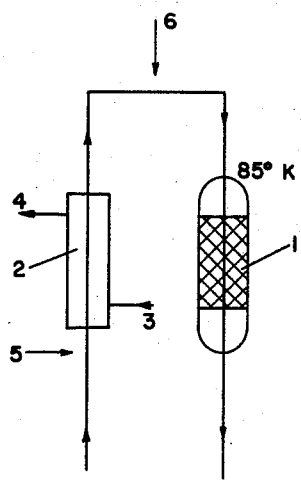
FIG. 2
INVENTORS
WILHELM LEHMER
WOLFGANG BALDUS
BY *Pierce, Scheffler & Parker*
  *their* ATTORNEYS United States Patent Office 3,155,469
Patented Nov. 3, 1964

3,155,469
PROCESS FOR REMOVING TRACE ADMIXTURES FROM REACTOR COOLANT GAS
Wilhelm Lehmer and Wolfgang Baldus, Munich, Germany, assignors to Gesellschaft fur Linde's Eismaschinen Aktiengesellschaft, Munich, Germany, a company of Germany
Filed Jan. 5, 1962, Ser. No. 164,571
10 Claims. (Cl. 55—66)

This invention is based on the problem of freeing, by selective adsorption, a difficultly adsorbable carrier gas of easily adsorbable trace components whose concentration is so low that they can no longer be detected by means of conventional chemical or physical measuring methods. By way of example, we mention a helium-neon mixture originating from an atomic reactor plant which mixture is used as a protective and/or cooling gas and which contains traces of radioactive krypton and/or radioactive xenon. These radioactive impurities—which are present, for example, in concentrations of $10^{-7}$ to $10^{-9}$ parts by volume, must be removed to a residual content at least as low as $10^{-18}$ parts by volume, for example, in order to ensure the safety of the plant.

The adsorption characteristics inherent in such low concentrations, which are practically only measurable with radioactive substances, have hardly been investigated. For the description of the adsorption behavior there have been used, up to now, Langmuir's adsorption insotherms:

$$B = \frac{B_{inf.} \cdot p}{p+b}$$

wherein

"B" represents the adsorbed amount per unit of weight of the adsorbent;
"$B_{inf.}$" represents the maximum amount of adsorbed substance which the surface can retain in the state of of saturation;
"b" represents a constant characteristic of each system; and
"p" represents the pressure of the gas to be adsorbed in the adsorption equilibrium. Instead of the pressure "p" can also be used the concentration "C."

The loadability "B" in the state of saturation ("B" equals "$B_{inf.}$") is thus independent of the pressure and of the concentration respectively, since in this case—because "p" is much greater than "b"—the constant "b" in the denominator can be neglected. For very low pressures or concentrations ("p" much less than "b"), however, there is proportionality between "B" and "p" according to Langmuir.

As the measurements according to the invention have shown, the law of proportionality between "B" and "p" is not generally valid in the lowest concentration range which is of interest here; it was found, rather, that the loadability "B" of the adsorbent drops more with decreasing pressure "p" of the gas to be adsorbed than corresponds to proportionality.

In the range "p" much less than "b," Langmuir's adsorption isotherm represents a straight line, as already mentioned. Since a straight line drawn in the decadic scale always appears in the logarithmic scale as a straight line with an angle of inclination of 45°, the adsorption isotherm plotted in the logarithmic scale must extend as indicated by the dot-dashed line in FIG. 1 of the appended drawing, if Langmuir's formula is to be valid. But the actually measured course (curve in FIG. 1) shows that the loadability "B" drops more with decreasing concentration in the range of low concentrations than corresponds to proportionality, since the adsorption isotherm at 90° K., for example, only extends a short distance (section 1–11) under an angle of 45° and then assumes a steeper angle with dropping concentration. It follows that the amount of the adsorbent that can adsorb a certain amount of the substance to be adsorbed increases more with dropping concentration. It follows, also, that the amount of the adsorbent that can adsorb a certain amount of the substance to be adsorbed increases more with dropping concentration than corresponds to proportionality, so that disproportionately more adsorbent must be used for the elimination of minute traces of impurities, or that—with constant amount of the adsorbent—the life of the adsorbers is substantially shorter than with higher concentration of the impurities.

In order to eliminate these difficulties, the loadability "B" of the adsorbent for the trace component must be increased. This is done according to the invention by adding to the carrying gas, which is substantially more difficultly adsorbable, related to equal pressure and equal temperature than are the trace impurities contained therein and which contains these trace-impurities in such low concentrations that one is working below the proportionality range of the adsorption isotherm, a gas in such an amount that the loadability of the adsorbent is now in that range of the adsorption isotherm in which the concentration and loadability are proportional to each other, adsorbability of the added gas—related to equal pressure and equal temperature—ranging between the adsorbabilities of the trace impurity and of the carrying gas.

The concentration range in which the angle of inclination of the adsorption isotherem (in the logarithmic scale) is greater than 45°, depends substantially on the state (pressure and temperature), and on the nature, of the contained trace impurities. In the above mentioned example of a helium-neon mixture with traces of radioactive krypton, the total amount of the easily adsorbable gas must be brought to a value of 1–10 p.p.m. by the addition of inactive krypton, if the adsorption is to take place in the proportionality range between the loadability and concentration of the easily adsorbable gas. Due to this increase of the loadability of the adsorbent according to the invention, the adsorbability of the adsorbent for the trace impurity is greatly increased and, thus, the life of the adsorber.

In a similar manner as for radioactive krypton, the adsorption conditions for radioactive xenon can be improved by the addition of inactive krypton, since the krypton is practically adsorbed together with the radioactive xenon.

Another example is the removal of traces on inactive argon from helium carrying gas. Inactive argon must be removed to a great extent from the circulating gas in the reactor, because it can easily be activated by radiation in the reactor itself. In this case neon is added to the argon-contaminated helium, thus at the same time increasing the loadability for the impurity plus the added gas. Since neon is hardly activated in the reactor, its presence in the circulating gas is not harmful.

FIG. 1 shows in a schematic qualitative representation the adsorption-isotherm of krypton as the adsorbed substance and charcoal as the adsorbent. On the ordinates are plotted logarithmically the numerical values of B in cubic centimeters, measured under normal conditions of temperature and pressure, $Ncm.^3$, of adsorbable krypton per gram of charcoal, while the concentration "C" of krypton in a gas mixture containing helium and neon is plotted logarithmically on the abscissa. Below the point indicated by the arrow, a slight reduction of the concentration of krypton from "$C_1$" to "$C_2$" effects a considerable reduction of the loadability "B" from "$B_1$" to "$B_2$." According to the invention, this anomaly is counteracted by adding so much inactive krypton to the starting mixture of helium and neon containing traces of radioactive krypton, originating from the atomic reactor plant, that the total krypton concentration assumes the value "$C_3$," so that the working point of the adsorption method is displaced to the point indicated by the arrow, where "B" and "C" are proportional to each other. A part of the added inactive krypton arrives in the carrying gas, but in contrast to radioactive krypton, it has no harmful effect here.

The following numerical example shows on the basis of FIG. 1 how the increase of the total krypton concentration from "$C_1$" and "$C_2$," respectively to "$C_3$," affects the life of the adsorber.

$10^7$ $Ncm.^3/h$. helium gas under atmospheric pressure (1 atm. abs.) with a admixture of radioactive krypton in an amount of "$C_1$" equals $10^{-7}$ parts by volume are to be purified by adsorption at a temperature of about 90° K. A loadability per gram of the adsorbents of $B_1 = 2Ncm.^3$ krypton is to be expected; 1 kg. adsorbent can thus absorb 2000 $Ncm.^3$ krypton. The amount of krypton added per hour is $10^7 \cdot 10^{-7} = 1$ $Ncm.^3$. This gives a life of 2000 hours.

However, if the admixture of radioactive krypton is of the order of $C_2 \approx 10^{-9}$, 1 gram of the adsorbent has a loadability of $B_2 \approx 2 \cdot 10^{-3}$ $Ncm.^3$ krypton; 1 kg. absorbent can thus adsorb 2 $Ncm.^3$ krypton. The amount of krypton added per hour is $10^7 \cdot 10^{-9} = 10^{-2}$ $Ncm.^3$. This makes possible a life of 200 hours for 1 kg. krypton. In other words: for equal purification time, a ten times higher amount of the adsorbent must be provided in the second case.

If the total krypton concentration is concerned by the addition of inactive krypton from $C_2 = 10^{-9}$ parts by volume to $C_3 \approx 10^{-6}$ parts by volume of active krypton plus inactive krypton, a loadability of $B_3 \approx 30$ $Ncm.^3$ krypton per gram adsorbent can be expected, and we obtain with 1 kg. adsorbent a calculated operating time of $$\frac{30{,}000}{10^7 \cdot 10^{-6}} = 3000 \text{ h.}$$

After this time the concentration of krypton in the gas mixture is no longer changed by the adsorbent.

In the last-mentioned example, there are during the purification after an operating time of 200 hours, $10^{-9}$ parts by volume of active krypton plus inactive krypton in the gas leaving the adsorber, the ratio between active and inactive krypton being 1:1000. This break-through concentration increases to the end of the operating time (3000 h.) to $10^{-6}$ parts by volume, the ratio between active and inactive krypton remaining 1:1000. After 3000 hours there are thus $10^{-9}$ parts by volume active krypton in the gas leaving the absorber, while this already would be the case after 200 hours without the addition of the inactive krypton. Without the addition of inactive krypton it would thus be necessary to provide a 15 times greater amount of the adsorbent. The advantage is the greater the lower the concentration of active krypton is in the gas to be purified.

Depending on the required purity, a corresponding addition must be made to the calculated amount of adsorbent, because of the break-through front which increases in time.

When the additional gas is supplied, the carrying gas can have any desired temperature. It is possible to add the gas simultaneously at different points of the plant, if necessary in different percentages.

The added gas can have either the same temperature as that of carrying gas or a higher or lower temperature. Since the additions are added only in small amounts, the temperature of the addition can generally even be substantially higher than that of the supporting gas.

FIG. 2 shows in a schematic representation an arrangement for carrying out the process according to the invention. In this figure, 1 designates an adsorption vessel containing an adsorbent, such as activated carbon, gel and the like, through which is conducted in the direction of the arrow a starting gas consisting of neon, helium and traces of radioactive krypton and xenon. 2 designates a heat-exchanger connected to the inlet side of the adsorption vessel, by which the starting gas mixture entering at a temperature of about 100° K. is cooled to about 85° K. by means of a gas to be heated, issuing at 3 and 4 respectively, to pass through the adsorber 1 at particularly favorable operating temperatures. At the points of the gas line designated by the arrows 5 and 6 there are provided inlets for the addition of inactive krypton and/or xenon. The amount of gas to be added and the inlet points depend on the other conditions given by the entire plant, regarding temperatures, gas pressures and available amounts and properties of krypton and/or xenon.

This application is a continuation-in-part of our patent application Serial No. 821,857, filed June 22, 1959, now abandoned.

We claim:

1. Process for the removal of trace impurities from a carrying gas by adsorption, in which the trace impurity, related to equal conditions of pressure and temperature, is much more readily adsorbable than the carrying gas and in which the concentration of impurity is so slight that the loading capacity of the adsorbent decreases faster with decreasing concentration of impurity than would correspond to proportionality, the process consisting essentially in adding an amount of gas to the carrying gas containing the trace impurity, the adsorbability of said additional amount of gas, related to equal conditions of pressure and temperature, being between the adsorbabilities of the trace impurity and of the carrying gas, thereby raising the loading capacity of the adsorbent for the impurity into that range in which loading capacity and total concentration of impurity and additional gas are proportional, and thereafter subjecting the resulting gas mixture to sorbtive treatment.

2. Process as defined in claim 1, in which the carrying gas is helium, the trace impurity is argon and the additional gas is neon.

3. Process for the removal of traces of radioactive gas from a carrying gas by adsorption as defined in claim 1, in which the impurity is radioactive xenon and the additional gas is non-radioactive krypton.

4. Process for the removal of traces of radioactive gas from a carrying gas by adsorption as defined in claim 1, in which the additional amount of gas consists of the gas present as trace impurity but in non-radioactive condition.

5. Process as defined in claim 4, in which the carrying gas is a mixture of helium and neon, the trace impurity is krypton in radioactive condition and the added gas is krypton in non-radioactive condition.

6. Process as defined in claim 5, in which the trace impurity in the carrying gas to be purified has a concentration of $10^{-3}$ to $10^{-1}$ p.p.m.

7. Process as defined in claim 5, in which the total concentration of krypton after the addition is between 1 p.p.m. and 10 p.p.m.

8. Process as defined in claim 1, in which both the carrying gas and the additional amount of gas before addition are brought to adsorption temperature.

9. Process as defined in claim 1, in which the carrying gas is brought to adsorption temperature, and the additional amount of gas is introduced with a temperature above adsorption temperature.

10. Process as defined in claim 1, in which the additive gas has a temperature above adsorption temperature, and is introduced into the carrying gas before and after the carrying gas has been brought to adsorption temperature.

References Cited in the file of this patent
UNITED STATES PATENTS

| | | |
|---|---|---|
| 1,906,917 | Peters | May 2, 1933 |
| 2,835,343 | Wolff | May 10, 1958 |
| 3,039,948 | Krucoff | June 19, 1962 |
| 3,074,868 | Turkevich | Jan. 22, 1963 |